017# United States Patent [19]

Chiolle et al.

[11] 4,230,583
[45] Oct. 28, 1980

[54] SUPPORTED ANISOTROPIC REVERSE OSMOSIS MEMBRANES BASED ON SYNTHETIC POLYAMIDES AND PROCESSES FOR THEIR PREPARATION

[76] Inventors: Antonio Chiolle, 44, Via V. Leati, Ferrara; Giuseppe Gianotti, 20, Via Rosmini, Novara; Gianfranco Parrini, 46/9, Via della Moscova, Milan, all of Italy

[21] Appl. No.: 951,365

[22] Filed: Oct. 16, 1978

Related U.S. Application Data

[63] Continuation of Ser. No. 708,969, Jul. 26, 1976, abandoned.

[30] Foreign Application Priority Data

Jul. 30, 1975 [IT] Italy ................................. 25908 A/75

[51] Int. Cl.$^2$ .............................. C08J 3/16; C08J 5/18
[52] U.S. Cl. ................................ 210/490; 210/500 M
[58] Field of Search ............. 210/500, 490, 491, 23 H, 210/22, 321; 264/41, 46, 49, 233, 299, 344

[56] References Cited

U.S. PATENT DOCUMENTS

| | | | |
|---|---|---|---|
| 3,526,588 | 9/1970 | Michaels | 210/500 M |
| 3,556,305 | 1/1971 | Shorr | 210/500 M |
| 3,567,632 | 3/1971 | Richter et al. | 210/500 M |
| 3,615,024 | 10/1971 | Michaels | 210/500 M |
| 3,822,202 | 7/1974 | Hoehn | 210/321 R |
| 3,884,801 | 5/1975 | Kesting | 210/23 H |
| 3,907,675 | 9/1975 | Chapurlat | 210/23 H |
| 3,925,211 | 12/1975 | Schumann | 210/500 M |
| 3,933,653 | 1/1976 | Hashimo | 264/41 |
| 3,935,172 | 1/1976 | Vogl | 210/500 M |
| 3,969,452 | 7/1976 | Oliberti et al. | 210/23 H |

*Primary Examiner*—Theodore A. Granger
*Attorney, Agent, or Firm*—Hubbell, Cohen, Stiefel & Gross

[57] ABSTRACT

Supported anisotropic reverse osmosis membrane based on synthetic polyamides are prepared by first preparing a support therefor for treating a material suited for serving as a support for a polyamide membrane, with a heat resistant water soluble polymer which is insoluble in the polar solvents to be used for preparing the polyamide solution described below; preparing a solution of the polyamide in an organic polar solvent, in the presence of a saline compound; spreading the thus prepared polyamide solution onto the prepared support; partially evaporating the solvent by heating; coagulating the membrane in an aqueous medium; and optionally, thermally treating the membrane.

16 Claims, No Drawings

SUPPORTED ANISOTROPIC REVERSE OSMOSIS MEMBRANES BASED ON SYNTHETIC POLYAMIDES AND PROCESSES FOR THEIR PREPARATION

CROSS REFERENCE TO RELATED APPLICATIONS

This is a continuation of application Ser. No. 708,969, filed July 26, 1976, now abandoned.

BACKGROUND OF THE INVENTION

1. Field of the Invention

The present invention relates to supported anisotropic reverse osmosis membranes based on synthetic polyamides and processes for their preparation.

2. The Prior Art

It is known that many synthetic polyamides may be used with success in the preparation of anisotropic membranes for reverse osmosis, which membranes have good salt rejection characteristics and a high water flux.

Unfortunately, such membranes do not possess altogether satisfactory mechanical properties. In general, serious difficulties are encountered in assembling these membranes into particular types of reverse osmosis modules such as tubular, spiral and the like modules.

In order to overcome these disadvantages, numerous procedures have been suggested. One such procedure involves the use of supported polyamide membranes, namely membranes containing homogeneously incorporated therein a support such as cloth, fabrics or fibers of various types, shapes and sizes, for improving the physical-mechanical characteristics of the membranes and for facilitating their assembly into reverse osmosis modules of any type, shape and dimension.

This procedure, however, is not altogether free of disadvantages. In fact, in the case of processes for the preparation of membranes in which the solution is spread on one face of the support or carrier, or the support is immersed or dipped into the polyamide solution, it has been observed that a thick layer of polymeric material, which will seriously compromise the subsequent working of the membrane, forms on both faces of the carrier. In fact, such a membrane initially exhibits low water flux and high salt rejection and then, due to the accumulation of salt around the membrane, the phenomenon is reversed and it exhibits low saline rejection and high water flux.

In the case of processes consisting of laying the support or carrier on a glass sheet and subsequently spreading over the glass sheet a polyamide solution (which is then followed by evaporation of the solvent and the coagulation in an aqueous medium of the membrane) the polyamide solution penetrates into the meshes of the support at the moment of the spreading, this, of course, causes the same disadvantages as in the previously noted situation. Moreover, part of the air trapped between the glass sheet and the support remains incorporated in the polyamide solution and leads to the emergence of air bubbles which, in turn, produce superficial faults in the membrane during the evaporation of the solvent. This causes a serious deterioration in the flux rate and/or saline rejection characteristics of the membranes.

It is an object of the present invention to provide a process for the preparation of supported anisotropic reverse osmosis membranes based on synthetic polyamides, and the membranes themselves, which are free of the above-mentioned disadvantages.

SUMMARY OF THE INVENTION

In accordance with this invention, there are provided supported anisotropic reverse osmosis membranes based on synthetic polyamides, and processes for their preparation. The process according to the invention comprises, in the order given, the following steps:

1. preparation of supports by treating materials suitable for use as a support for polyamide membranes, with water soluble polymers that are resistant to high temperatures, in particular to temperatures between 80° and 140° C., and which are insoluble in the polar solvents used for the preparation of the polyamide solutions;
2. preparation of a polyamide solution in an organic polar solvent, in the presence of saline components;
3. spreading of the polyamide solutions on the supports prepared according to step 1;
4. partial evaporation of the solvent by heating;
5. coagulation of the membranes in an aqueous medium; and finally, preferably, but not necessarily;
6. thermal treatment of the thus obtained membranes.

FIRST PHASE

The material of which the support consists may be selected from a wide range of synthetic, natural or artificial products such as polypropylene, rayon, polymers or copolymers of vinylidene chloride, polymers or copolymers of acrylonitrile, glass fibers, asbestos fibers, cotton, polyester fibers and the like.

All of these materials may be in the form of fabrics, cloth or other manufactured flat, tubular (or any other desirable shape) products.

All of these materials must be capable of resisting, at high temperatures, the solvents used in the casting of the polyamide membrane. Moreover, the above materials must not show any appreciable variations in volume with varying temperatures in the range of 20° C. to 100° C.

In order to insure good working of the polyamide membranes in reverse osmosis processes, the material used as the support must be inexpensive and moreover must:

be resistant to the pressures used in reverse osmosis processes without breaking or excessively clogging;

have at least one smooth face with a homogeneous structure so that the membrane is not locally damaged when it is under pressure;

have a sufficiently high porosity so as not to produce excessive load losses; and finally, it must possess good chemical resistance in acid and alkaline media and be resistant to oxidizing agents. In any event, it must have a mean life span greater than that of the membrane itself.

The polymers suitable for use in the treatment of the supports may be selected from a wide range of natural, synthetic and artificial water soluble polymeric materials, resistant to high temperatures, and more particularly to temperatures between 80° and 140° C., and must be insoluble in the polar solvents used for the preparation of the polyamide solutions.

Typical examples of such materials are water soluble acrylic and methacrylic polymers and copolymers, such as homopolymers of acrylic and methacrylic acid; copolymers of acrylic acid with vinylpyrrolidone; polyvinyl-methylether, polyacrylamides, polymethacrylamides, copolymers of acrylamide with amides such as dimethylamino-acrylamide and dimethylamino-propylamide; water soluble derivatives of cellulose such as hydroxyalkylcellulose, carboxyalkylcellulose and the like.

The cloth, fabric or other manufactured articles to be used as supports for the spreading of the membrane are homogeneously coated with a thin layer of the water soluble polymer.

This spreading operation may be carried out in various ways; however, a preferred technique comprises:

preparing an aqueous solution of the water soluble polymer;

dipping the support in or spreading said solution on it at a suitable temperature which, in general, is about room temperature, for a period varying from 1 second to 1 hour, preferably between 10 seconds and 30 minutes; and finally, drying the support which has been thus treated with the solution, in an oven at a temperature between 40° C. and 140° C., for a period of from 1 minute to 1 hour, preferably between 1 minute and 40 minutes.

This treatment of the support with water soluble materials allows one to avoid the evaporation of the film-generating solvent (solvent used for dissolving the polyamide) from the side of the support; in this way a differentiated evaporation takes place, wherefore, after coagulation of the membrane in an aqueous medium, an asymmetrical structure is formed.

Such a treatment offers, moreover, the advantage of hindering the passage of the casting solution through the support during evaporation of the solvent at high temperature, due to the consistent decrease in viscosity of said solution with varying temperature (from 20° C. to about 140° C.).

SECOND PHASE

The process according to the invention may be applied to the preparation of supported membranes based on any type of polyamide. At any rate, it is particularly suited in the case of polyamides having good solubility in organic polar, water soluble solvents, belonging to class m of the solvents that form hydrogen bonds (m-H bonding group) with a solubility parameter $\delta > 8$ (cal/cc)$^{\frac{1}{2}}$ according to the classification system of H. Burrel, in "Polymer Handbook IV" page 341, J. Brandrup, E. N. Immergut, Editor, Interscience, N.Y.

Examples of such solvents are dimethylformamide, dimethylacetamide, diethylformamide, diethylacetamide, dimethylsulphoxide, N-methyl-pyrrolidone, tetramethylsulphone, and the like.

These solvents may be used alone or in admixture with smaller amounts of other solvents belonging to class s according to the above indicated classification system.

Illustrative but not limiting examples of such polyamides are the (co)polypiperazinamides, i.e., the polycondensation products of piperazine or its derivatives substituted in the nucleus (possibly in admixture with other diamines) with anhydrides or dichlorides of aromatic and heterocyclic, saturated or unsaturated dicarboxylic acids such as for instance fumaric, mesaconic, adipic, phthalic, isophthalic acid, phthalic acids substituted in the aromatic nucleus and heterocyclic acids derived from furazane, thiofurazane, pyridine, furan, thiophene and the like.

Other examples of polyamides are those described in U.S. Pat. Nos. 3,567,632 and 3,518,234 and in particular the polyamides formed from phthalic acids (ortho, iso and terephthalic) and phenyldiamines (meta and para) and those containing simple or substituted benzimidazolic groups.

A water soluble salt which is also soluble in the organic solvent is present as a third component in the polyamide solution. Examples of such salts are LiCl, LiNO$_3$, LiBr, CaCl$_2$, ZnCl$_2$, MgCl$_2$, Mg(ClO$_4$)$_2$ and other like salts. In addition to this saline component water may also be present in the solution.

In general, the salt is present in the solution in considerable quantities in comparison with the polyamide; in general the weight ratio of polyamide/salt is between 1 and 10.

The polyamide concentration in the solution may vary within a wide range, in general between 5% and 60% and preferably between 8% and 25% by weight, with respect to the weight of the solution.

The solution may be prepared following different methods; for example, in one such method the solvent-+polyamide mixture is subjected to mechanical stirring, eventually heating the mixture at temperatures which, depending on the type of polyamide, solvent and the polyamide/solvent weight ratio range from 20° C. to the boiling temperature or the degrading temperature of the solvent, and in general at temperatures between 40° and 180° C.; after which, the thus obtained solution is filtered through a porous filter or a filtering membrane or through other filtering systems.

The properties of the membranes that are obtained from this solution depend largely on the quality of the prepared solution.

THIRD PHASE

The solution obtained in the second phase is spread on the support or carrier prepared in the first phase.

The spreading may be achieved in various ways. For example, the solution may be spread on the support by means of a film spreader so as to form a thin layer of solution on the support itself.

The spreading is carried out on flat supports if one wishes to obtain supported membranes of a flat shape. If supported membranes of a tubular shape are desired, the polyamide solution will be extruded into the inside of the tube that acts as the support and which is rotated about its axis and into which is fed a nitrogen current.

In the case where the polyamide solution is spread on the outside surface of the supporting tube, the latter (closed at one or both of its ends) is immersed into the polyamide solution or alternatively, the latter is uniformly spread on the outer surface of the tube, for example, by extrusion. The thickness of the cast film may vary over a wide range and is generally between 0.02 and 0.8 mm, depending on the characteristics of the support.

FOURTH PHASE

The thin layer of polyamide solution, spread on the support of suitable shape, is placed into an oven to partially evaporate the solvent. The evaporation time and temperature depend on the type of solvent, on the composition of the casting solution, on the type of polyamide and on the type of water soluble polymer used.

The evaporation temperature in general is between 40° C. and 180° C., while the evaporation time is between 1 minute and 3 hours.

FIFTH PHASE

The film from solution as obtained in the fourth phase, is coagulated either in water or in an aqueous saline or alcoholic solution (i.e., containing small quantities of inorganic salt and/or organic compounds containing one or more OH groups, such as lower aliphatic alcohols, glycols or ethers, at a temperature between 0° C. and 30° C. and for a period of time between 1 minute and 60 minutes. In this phase the real formation of the semipermeable membrane occurs. Moreover, during this phase, the water soluble polymer layer which had been spread on the support during the first phase goes into solution and the membrane automatically and homogeneously adheres to the support.

SIXTH PHASE

The membranes, as obtained from the fifth phase, do not always show completely satisfactory reverse osmosis characteristics; the flux in general is very high, usually greater than 500 liters/sq.m. day, but the saline rejection is in general low and usually below 50%.

The thermal treatment, i.e., that of phase 6 of the process according to the invention, obviates these disadvantages and causes a considerable and long lasting increase in the desalting capacity of the membrane.

The thermal treatment may be conducted in various ways; according to a preferred method the membranes are placed into hot water for a period of time between 1 minute and 5 hours, preferably between 5 minutes and 2 hours, at a temperature between 40° C. and 100° C.

The "gel" structure of the membrane is evidenced by the high water content of the membranes, greater in fact than 20% by weight, and generally between 40% and 80% by weight.

The permeability to water of the membranes may be defined by the following equation:

$$\text{flux of water} = \frac{\text{amount of water flown through (l)}}{\text{membrane surface} \times \text{time}}$$

(lt/sq.mt.d)    (sq.mt.)    (days)

It may also be defined as a constant A of the membrane, by the following equation:

$$\text{Constant of the membrane} = A = \frac{\text{water flux (lt/sq.mt.d)}}{\text{applied effective pressure}}$$

(lt/sq.mt.d.atm.)    (atm.)

wherein the expression "applied effective pressure" means the difference $(\Delta P - \Delta \pi)$, wherein $\Delta P$ is the difference in hydraulic pressure applied on the two faces of the membrane and $\Delta \pi$ is the difference in osmotic pressure between the feeding solution and the solution crossing the membrane.

The membranes of the invention have a membrane constant that, in general, is rather high.

For exemplification purposes only, it is noted that membranes having a saline rejection greater than 98% and which may be used for desalting of sea water in a single passage, may be obtained according to the invention with a membrane constant greater than 3.2 l/sq.mt.d.atm. (which, with an applied pressure of 80 atm. and a feed of 35,000 ppm of NaCl, corresponds to a flux of about 200 l/sq.mt.d). In addition, membranes suited for the desalting of brackish waters, with a saline rejection greater than 90% may be obtained with a membrane constant greater than 8.3 l/sq.mt.d.atm. which with a pressure of 80 atm. and with a feed of 10,000 ppm of NaCl corresponds to a flux of about 600 l/sq.mt.d.).

The osmotic pressure (in atm.) for an NaCl solution may be calculated approximately from the equation $\pi = 8.2 \times C_1$, wherein $C_1$ is the saline concentration of the solution in % by weight. As is known, the efficiency of a membrane increases as its membrane constant and saline rejection increase.

The membranes of the invention permit one to obtain in a single passage desalted waters (with a salt content of less than 500 ppm) starting from brackish or sea waters, with water flux values that make this procedure extremely convenient.

Moreover, for some types of treatments, it may be more convenient to obtain membranes with very high fluxes and a somewhat lower saline rejection.

Thus, there may be obtained membranes with a constant A between 50 and 90 l/sq.mt.d.atm. and a saline rejection between 50% and 90%.

The membranes of the invention exhibit a particular resistance against packing resulting from the applied pressure. This results in a long working life for the membrane; this particular resistance to packing makes these membranes particularly suitable for the desalting of sea water, in the treatment of which, very high pressures are generally used.

The membranes of the invention are, moreover, particularly effective in various separation and concentration processes in which the principle of reverse osmosis may be applied, such as, purification of polluted water drains; recovery of organic solutes; treatment of food solutions such as milk, coffee, tea, citrus juices, whey, tomato juice, sugar solutions; separation of azeotropes; separation and concentration of biological and pharmaceutical products such as hormones, proteins, vitamins, antibiotics, vaccines, aminoacids; and other similar processes.

DESCRIPTION OF THE PREFERRED EMBODIMENTS

The following examples are given for illustrative purposes without, however, limiting the invention as defined in the claims.

EXAMPLE (A) PREPARATION OF SUPPORTS

A series of supports consisting of cloths of various types, the characteristics of which are reported in Table I, were treated with water soluble polymers having the characteristics recorded in Table II.

Thereafter, an aqueous solution of water soluble polymer was prepared, operating at room temperature and under vigorous stirring. This solution was then filtered on a filter with a porosity of 0.5 micron, and the filtered solution was left to deareate overnight.

The flat-shaped supports thus treated were then spread with the aqueous solutions of the water soluble polymeric materials, at room temperature. Subsequently the thus treated supports were dried in an oven under heavy ventilation, for the times and temperatures given in Table III.

(B) PREPARATION OF SUPPORTED MEMBRANES

For preparing the solutions of polymeric materials to be spread on the supports prepared according to the procedures described above, polyamides and copolyamides of various types were used.

Tables IV and V list the characteristics of said polyamides and copolyamides, the solutions obtained therefrom and the spreading and drying conditions maintained during the preparation of the supported membranes.

In practice, the solutions were prepared using the components indicated in Tables IV and V, and subjecting the polyamide+solvent+salt mixture to stirring until clear solutions were obtained, which solutions were then filtered on filters of 5 and 2 microns and by then spreading these mixtures on the supports prepared according to the procedure described above under (A).

The thin layer of polyamide solution spread onto the support was partially dryed in an oven heated from the bottom, at temperatures and for the times indicated in Tables IV and V. Thereafter, the film and the support adhering thereto were immersed into ice water kept under stirring, so that the salt, the residual solvent and the water soluble polymer were thus removed.

The asymmetric membranes thus obtained, before being used in reverse osmosis processes, were kept in water at 20° C. for at least 24 hours.

The reverse osmosis tests, the results of which are recorded in Tables IV and V, were carried out over a period of time greater than 2 days, under the following conditions:

| | | |
|---|---|---|
| operational pressure | = | 60 kg./sq.cm. |
| NaCl concentration in the feed | = | 10,000 ppm |
| temperature | = | 25° C. |

TABLE I

Characteristics of the Cloths Used in the Preparation of the Supports

| REINFORCING CLOTH | | CHARACTERISTICS OF THREAD | | Number of Threads per cm. | | Thickness of Cloth |
|---|---|---|---|---|---|---|
| Type | Chemical Nature | Warp | Weft | Warp | Weft | |
| A | Cotton | 65 denier | 79 denier | 53 | 35 | 160 micron |
| B | Polyethylenterephthalate* | 50 denier | 70 denier | 53 | 35 | 160 micron |
| C | Polypropylene** | 100 denier | 100 denier | 120 | 56 | 300 micron |
| D | Polyvinylidenchloride | 91 denier | 91 denier | 59 | 59 | 100 micron |
| E | Polyethylenterephthalate** | 70 denier | 70 denier | 59 | 59 | 100 micron |
| F | Polypropylene** | 106 denier | 106 denier | 47 | 47 | 105 micron |
| G | Polyethylenterephthalate*** | 125 denier | 125 denier | 42 | 33 | 150 micron |

*texturized
**continuous filament
***calendered

TABLE II

Characteristics of Water Soluble Polymeric Materials Used For the Treatment of the Reinforcing Cloths

| Type of Polymeric Material | Initials | Producer |
|---|---|---|
| Polyacrylic acid with molecular weight of about 50,000 | PA | Cofaltz & Farbenfabriken Bayer - Germany |
| Methylcellulose with a viscosity of 4,000 cp aμ at 25° C. | MC | Fluka - Germany |
| Separarne NP 10 - copolymer of acrylamide and acrylic acid | SNP-10 | Dow Chem. GmbH - Germany |
| Separarne AP-45 - copolymer of acrylamide and acrylic acid | S-AP-45 | Dow Chem. GmbH - Germany |
| Polyvinylpyrrolidone | PVP | General Aniline & Film Corporation - Germany |
| Polyvinylalcohol with molecular weight of 14,000 | PVA | BDH Chem. Ltd. - Great Britain |
| Vinylpyrrolidone-vinyl acetate copolymers | E-735 E-335 | G.A.F. S.r.l. - Italy |

TABLE III

Treatment Conditions of the Supporting Cloths With Water Soluble Polymer Materials

| Type of Support | Type of Cloth(1) | Type of Water Soluble Polymer(2) | Polymer Concentration in Water (wt. %) | Thickness of Coating of Cloth in microns | Drying Conditions °C. | Drying Conditions Minutes |
|---|---|---|---|---|---|---|
| 1 | A | PA | 50 | 100 | 70 | 8 |
| 2 | B | PA | 50 | 100 | 70 | 8 |
| 3 | C | PA | 50 | 200 | 70 | 10 |
| 4 | D | PA | 50 | 80 | 70 | 5 |
| 5 | E | PA | 50 | 80 | 70 | 5 |
| 6 | F | PA | 50 | 80 | 70 | 5 |
| 7 | G | PA | 50 | 100 | 70 | 8 |
| 8 | A | MC | 1.7 | 100 | 70 | 8 |
| 9 | B | MC | 1.7 | 100 | 70 | 8 |
| 10 | C | SNP-10 | 1.0 | 200 | 70 | 10 |
| 11 | D | SAP-45 | 1.0 | 80 | 70 | 5 |
| 12 | E | PVA | 1.7 | 80 | 70 | 5 |
| 13 | F | E-735 | 1.7 | 80 | 70 | 5 |

TABLE III-continued

Treatment Conditions of the Supporting Cloths With Water Soluble Polymer Materials

| Type of Support | Type of Cloth(1) | Type of Water Soluble Polymer(2) | Polymer Concentration in Water (wt. %) | Thickness of Coating of Cloth in microns | Drying Conditions °C. | Minutes |
|---|---|---|---|---|---|---|
| 14 | G | E-335 | 1.7 | 80 | 70 | 5 |

(1)See Table I
(2)See Table II

TABLE IV

Osmotic Performance of Supported Anisotropic Membranes Based on Poly(trans-2,5-dimethylpiperazine-3,4-thiofurazanamide) (1) in Function of Supports of Various Types

| Type of Membrane | Type of Support | Flux | Performance of Membrane Saline Rejection | Resistance (2) | | Breaking Load at Moisture (2) | |
|---|---|---|---|---|---|---|---|
| 1 | 1-A | 519 1/sq.m.d | 96.0% | — kg./sq.cm. | | kg./sq.cm. | |
| 2 | 2-B | 508 " | 98.2% | >9 | " | 530 | " |
| 3 | 9-B | 556 " | 98.7% | >9 | " | 530 | " |
| 4 | 10-C | 456 " | 90.8% | >9 | " | 345 | " |
| 5 | 11-D | 780 " | 88.7% | >9 | " | | |
| 6 | 12-E | 480 " | 95.8% | >9 | " | 995 | " |
| 7 | 13-F | 565 " | 90.9% | >9 | " | 300 | " |
| 8 | 14-G | 1043 " | 88.2% | >9 | " | 860 | " |
| 9 | 7-G | 789 " | 94.6% | >9 | " | 860 | " |
| 10 (3) | — | 600 " | 98.7% | 1.0 | " | 66 | " |

(1) A polyamide with a viscosity $\eta_{in}$ = 3.7 dl/g was used; the spreading solution was prepared in N-methylpyrrolidone; polyamide concentration = 10.5% by weight with respect to the solvent with about 3.5% by weight of LiCl, the viscosity of the solution at 30° C. was 300 poises; the thickness of the coating was 600 microns and the evaporation conditions were 120° C. for 12 minutes.
(2) According to ASTM D 638.
(3) These data concerning non-supported membranes are recorded for purposes of comparison.

TABLE V

Osmotic Performance of Supported Anisotropic Membranes Based on Various Polyamides Depending on Type of Support, Type of Polyamide and the Preparation Conditions of the Membranes Themselves

| Type of Membrane | Type of Support | Type of Polyamide | Inherent Viscosity in dl/g | LiCl wt % Based on Polyamide | wt % of Polyamide Based on Solvent | Type of Solvent | Coating Thickness (microns) | Evaporation Temperature and time (minutes) | Coagulation | Osmotic Properties Flux | Saline rejection |
|---|---|---|---|---|---|---|---|---|---|---|---|
| 11 | 2-B | (1) | 3.60 | 29 | 11 | NMP(5) | 600 | 120°/12 | in water at 0° C. | 540 1/m²d | 95 % |
| 12 | 2-B | (2) | 3.79 | 29 | 11 | NMP | 600 | 120°/13 | in water at 0° C. | 400 " | 97.9% |
| 13 | 2-B | (3) | 1.9 | 21 | 15 | NMP | 400 | 130°/10 | in CH₃OH at 30° C. | 170 " | 93.9% |
| 14 | 2-B | (4) | 0.8 | 30 | 15 | DMA(6) | 400 | 110°/15 | in water at 0° C. | 600 " | 94.5% |

(1) Copolyamide of 3,4-thiofurazan-dicarboxylic acid (80 mol%) and isophthalic acid (20 mol%) with trans 2,5-dimethylpiperazine.
(2) Copolyamide as in (1) in which the molar ratio between the two acids is equal to 50/50 instead of 80/20.
(3) Polyamidobenzimidazol obtained by condensation of terephthaloyl chloride and 2,4-diamino-diphenylamine and subsequent heating at 280°–300° C. for 3 hours.
(4) Copolyamide of m-phenylendiamine and isophthalic and terephthalic acids (molar ratio: 70/30).
(5) NMP = N-methyl-pyrrolidone.
(6) DMA = Dimethylacetamide.

From the data reported in Tables IV and V it will be readily noted that the supported membranes according to the invention possess excellent mechanical resistance characteristics combined with excellent osmotic performances (high flux and high salt rejection).

Variations and modifications can, of course, be made without departing from the spirit and scope of our invention.

Having thus described our invention what we desire to secure by Letters Patent and hereby claim is:

We claim:

1. A process for preparing a supported anisotropic reverse osmosis membrane based on synthetic polyamides, said process comprising the following steps in the order given:
   (a) preparing a support by treating a material suited for serving as a support for a polyamide membrane, with a water soluble polymeric material selected from the group consisting of polyacrylic acid having a molecular weight of about 50,000, methyl cellulose having a viscosity of 4000 cp au at 25° C., a copolymer of acrylamide and acrylic acid, polyvinylpyrrolidone, polyvinyl alcohol having a molecular weight of 14,000 and a copolymer of vinylpyrrolidone and vinyl acetate, said water soluble polymeric material being resistant to high temperatures and insoluble in the polar solvents to be used for preparing the polyamide solution described below in step (b);

(b) preparing a solution of the polyamide in an organic polar solvent, in the presence of a water soluble salt which is also soluble in the organic polar solvent, wherein the polyamide concentration is between 5% and 60% by weight and the weight ratio of polyamide/salt is between 1 and 10;

(c) spreading the thus prepared polyamide solution onto the support prepared according to step (a);

(d) partially evaporating the solvent by heating same at a temperature between 40° C. and 180° C. and for a time between 1 minute and 3 hours;

(e) coagulating the membrane in an aqueous medium to dissolve the water soluble polymeric material and remove it from said support; and (f) thermally treating the thus obtained membrane.

2. A process according to claim 1, wherein said soluble polymeric material is polyacrylic acid having a molecular weight of about 50,000.

3. A process according to claim 1, wherein said water soluble polymeric material is methylcellulose having a viscosity of 400 cp au at 25° C.

4. A process according to claim 1, wherein said water soluble polymeric material is a copolymer of acrylamide and acrylic acid.

5. A process according to claim 1, wherein said water soluble polymeric material is polyvinylpyrrolidone.

6. A process according to claim 1, wherein said water soluble material is polyvinyl alcohol having a molecular weight of 14,000.

7. A process according to claim 1, wherein said water soluble polymeric material is a copolymer of vinylpyrrolidone and vinyl acetate.

8. A process according to claim 1, wherein the treatment of the support with a water soluble polymeric material is effected by (a) preparing an aqueous solution of said water soluble polymeric material;

(b) immersing the support in said solution or spreading same thereon at about room temperature for a period of time varying from 1 minute to 1 hour; and then (c) drying the support in an oven at a temperature between 40° C. and 140° C., for a time ranging from 1 minute to 1 hour.

9. A process according to claim 8, wherein in step (b), the time is 2 to 30 minutes and in step (c), the time is 1 to 4 minutes.

10. A process according to claim 1, wherein the polyamide is a (co)polypiperazinamide.

11. A process according to claim 10, wherein said (co)polypiperazinamide is a polycondensation product of piperazine or a derivative thereof substituted in the nucleus-optionally in admixture with one or more other diamines; with an anhydride or dichloride of a saturated, unsaturated, aliphatic, aromatic or heterocyclic dicarboxylic acid.

12. A process according to claim 11, wherein said (co)polypiperazinamide is derived from at least one anhydride or dichloride of a dicarboxylic acid selected from the group consisting of fumaric acid, adipic acid, mesaconic acid, phthalic acid, isophthalic acid, said phthalic acids substituted in the aromatic nucleus, and heterocyclic acids derived from furazan, thiofurazan, pyridine, furane and thiophene.

13. A process according to claim 1, wherein the polyamide is selected from the group consisting of those derived from phthalic acids (ortho, iso and terephthalic acids) and m- or p-phenylenediamine and those containing a benzimidazolic group, whether substituted or unsubstituted.

14. A process according to claim 1, wherein said support comprises cloths, fabrics or other manufactured articles in a flat or tubular shape, made of synthetic, natural or artificial materials.

15. A process according to claim 14, wherein said support is a cloth made of a material selected from the group consisting of cotton, polyethylenterephthalate, polypropylene, polyvinylidenchloride and rayon.

16. A supported anisotropic reverse osmosis membrane prepared by the process of claim 1.

* * * * *